United States Patent [19]

Miller

[11] 4,419,106

[45] Dec. 6, 1983

[54] HYDROCARBON OILS WITH IMPROVED POUR POINTS

[75] Inventor: Richard F. Miller, Humble, Tex.

[73] Assignee: Atlantic Richfield Company, Los Angeles, Calif.

[21] Appl. No.: 350,921

[22] Filed: Feb. 22, 1982

[51] Int. Cl.³ .................................................. C10L 1/18
[52] U.S. Cl. .......................................... 44/62; 44/70; 526/329
[58] Field of Search ........................ 44/62, 70; 526/329

[56] References Cited

U.S. PATENT DOCUMENTS

| | | | |
|---|---|---|---|
| 2,403,267 | 7/1946 | Davis | 44/70 |
| 3,252,772 | 5/1966 | Clough et al. | 44/62 |
| 3,447,915 | 6/1969 | Otto | 44/62 |
| 3,454,378 | 7/1969 | Singh | 44/62 |
| 3,700,647 | 10/1972 | Nakaguchi et al. | 526/329 |
| 3,792,983 | 2/1974 | Tunkel et al. | 44/70 |
| 4,042,648 | 8/1977 | Kitamura et al. | 525/228 |

*Primary Examiner*—Paul F. Shaver
*Assistant Examiner*—Y. Harris-Smith
*Attorney, Agent, or Firm*—Coleman R. Reap

[57] ABSTRACT

Hydrocarbon oils containing, as a pour point depressant, a copolymer of an alkyl acrylate, the alkyl group of which contains about 12 to 40 carbon atoms and an alpha-monoolefin having about 12 to 40 carbon atoms, the copolymer having a weight average molecular weight of about 3000 to 50,000.

10 Claims, No Drawings

HYDROCARBON OILS WITH IMPROVED POUR POINTS

BACKGROUND OF THE INVENTION

This invention relates to hydrocarbon oils and more particularly to hydrocarbon oils having improved pour points.

In the storage, transportation and use of hydrocarbon fuel oils, e.g. crude oils, gas oils, distillate fuel oils, such as heating oils, diesel oils, turbo-jet fuels and residual fuel oils and the like, problems associated with the pour point of the oils have been long recognized. The pour point of an oil is defined as the lowest temperature at which the oil will flow when chilled without disturbance under specified conditions. Pour point problems arise through the formation of solid or semi-solid waxy particles in the oils when the oils are subjected to low temperatures in storage. A related problem also exists in respect of hydrocarbon residual fuel oils and waxy crude oils, in which the waxy components adversely affect the flowability and/or pumpability of the oil under low temperature conditions.

The formation of solid or semi-solid waxy particles in fuel oils and in waxy crude oils at temperatures just below their pour point causes serious distribution and/or operating difficulties. For example, the distribution of fuel oil by pumping is rendered difficult or impossible at temperatures below the pour point of the oil. Likewise, the flow of the oil at such temperatures through filters in heating systems cannot be maintained, resulting in the failure of the equipment to function. The formation of solid or semi-solid waxy particles in wax-containing crude oils gives rise to difficulties in the movement of such crude oils through pipelines at low ambient temperatures.

With respect to fuel oils, the aforementioned problems have been in part, remedied by lowering the end points of oils used for blending heating and diesel oils. It has also been suggested that the fuel oils, particularly distillate fuel oils, may be dewaxed, as for example, by urea dewaxing. However, dewaxing operations are costly and readjustment of end points causes a loss of valuable product as blending material for fuel oil stocks.

Another approach in overcoming the problem has been to attempt to find a pour point depressant which will lower the pour point of the fuel oil or crude oil. This is sometimes done to lower the pour point of lubricating oils. However, materials which are effective in lowering the pour point of lubricating oils are usually ineffective as pour point depressants for fuel oils or crude oils.

PRIOR ART

Pour point depressants appear to function by modifying the wax crystals so that they form smaller crystals having a reduced tendency to form gels. Different types of materials have been used as pour point depressants with varying degrees of success. High molecular weight polymers are among the more successfully used pour point depressants. U.S. Pat. No. 3,726,653 discloses two component residual fuel pour point depressants one component of which may be a copolymer of an alkyl ester of an unsaturated monocarboxylic acid and a mono-olefin. U.S. Pat. No. 3,447,915 discloses fuel oil pour point depressants comprised of a terpolymer of ethylene, propylene and a $C_1-C_{12}$ alkyl ester of acrylic or methacrylic acid. U.S. Pat. No. 4,042,648 and other patents referred to in the second paragraph of column 1 thereof disclose thermoplastic olefin-acrylic ester copolymers and their preparation. U.S. Pat. No. 3,968,148 discloses the preparation of oligomers of higher molecular weight olefins and higher molecular weight alkyl acylates which oligomers are useful as dispersant detergents for lube stocks. British Pat. No. 1,154,966 discloses the use of various homopolymers and copolymers as pour point depressants for petroleum fuels. Other U.S. patents which disclose copolymers of acrylates as pour point depressants are U.S. Pat. Nos. 2,604,453, 2,403,267, 3,304,260, 3,904,385 and 3,445,205. U.S. Pat. No. 3,567,639 discloses copolymers of ethylene and a vinyl ester as pour point depressants for crude oil and fuel oils.

Although the above polymeric pour point depressants may produce satisfactory results in specific applications, there is a continuing need for improved highly efficient oil pour point depressants having good pour point depressing properties in a wide range of hydrocarbon oils.

SUMMARY OF THE INVENTION

It is an object of the invention to present new hydrocarbon oil pour point depressants. It is another object of the invention to present hydrocarbon oil compositions having improved pour points. It is another object of the invention to present a method of lowering the pour points of hydrocarbon oils. These and other objects of the invention are supported in the following description and examples.

The objects of the invention are accomplished by incorporating into hydrocarbon oils a copolymer of an alkyl acrylate, the alkyl group of which has about 8 to 30 carbon atoms, and an alpha-monoolefin having about 12 to 40 carbon atoms. The copolymer desirably has a weight average molecular weight of about 1000 to 100,000 and is usually effective in concentrations of about 0.001 to 5 weight percent, based on the weight of hydrocarbon oil. Suitable copolymers are comprised of about 10 to 90 parts by weight of at least one alpha monoolefin and about 90 to 10 parts by weight of at least one alkyl acrylate per 100 parts by weight of total copolymer. In preferred embodiments the copolymer is comprised of about 20 to 75 parts by weight of alkyl acrylate having 16 to 28 carbon atoms in the alkyl group, and 25 to 80 parts by weight of alpha-monoolefin having 16 to 30 carbon atoms per 100 parts by weight of copolymer, the weight average molecular weight of the copolymer is in the range of about 3,000 to 50,000 and the copolymer is added to the hydrocarbon oil at a concentration of about 0.005% to 1% and most preferably 0.01 to 0.5%, based on the weight of the hydrocarbon oil. In the most preferred embodiment the copolymer is comprised of about 30 to 60 parts by weight of alkyl acrylate and about 70 to 40 parts by weight of alpha-monoolefin per 100 parts of total copolymer.

DETAILED DESCRIPTION OF THE INVENTION

The alkyl acrylates useful for the preparation of the pour point depressants are those having alkyl groups containing 8 to 30 carbon atoms. The alkyl groups may be linear or branched. Typical useful acrylates include n-dodecyl acrylate, n-octadecyl acrylate, n-eicosyl acrylate, n-docosyl acrylate, n-tetracosyl acrylate, n-triacotanyl acrylate, 2-ethylhexadecyl acrylate, 1- methylheptadecyl acrylate, etc. Preferred alkyl acrylates are those having about 16 to 28 alkyl carbon atoms such as n-octodeyl acrylate, 2-ethyloctadecyl acrylate, etc.

The alkyl acrylates used in the manufacture of products of this invention may be prepared by esterifying acrylic acid with alkanols having the desired carbon chain length and configuration.

Useful alcohols include normal and branched chain alcohols having 16 to 28 carbon atoms such as octadecanol, n-eicosanol and 2-ethylhexadecanol. Mixtures of these alcohols may also be used in the preparation of the alkyl acrylate reactants. Suitable alcohol mixtures are those sold by Continental Oil Company under the trademark "Alfols".

The copolymerization of the olefin and the alkyl acrylate can be accomplished by any of the known methods for polymerizing higher olefins. For example, the polymerization can be carried out in bulk, in solution, in emulsion or in the vapor phase using a wide variety of catalysts. Particularly useful catalysts are the free radical catalysts, such as the organic peroxides or azonitriles. Typical organic peroxides include acylperoxides, such as benzoyl peroxide; alkyl peroxides, such as t-butyl peroxide; ketone peroxides, such as methyl-ethyl ketone peroxide; hydroperoxides, such as cumene hydroperoxide; and peresters, such as t-butyl perbenzoate. A typical azo-nitrile is azo-bis-isobutronitrile. The particular catalyst used will depend upon the selected polymerization reaction temperature. The amount of catalyst used in the polymerization reaction generally is in the range of about 0.01 to 10 weight percent, and preferably is in the range of about 0.1 to 5 weight percent based on the total weight of monomers present in the reaction zone. The catalyst may be advantageously continuously charged to the reactor over the entire course of the reaction.

Where solution polymerization techniques are employed the solvent is preferably an aromatic compound, such as benzene, toluene, xylene or cumene. Cumene is advantageous because it provides significant chain-transfer activity.

The polymerization is generally carried out, for a period of several hours, at a temperature of about 50° to 120° C. Temperatures in the range of about 80° to 110° C. are generally preferred.

In a typical procedure for preparing the alkyl acrylate, the alcohol or alcohol mixture is reacted with acrylic acid by means of a suitable esterification catalyst, such as p-toluenesulfonic acid, in the presence of a polymerization inhibitor, such as hydroquinone. The esterification reaction is preferably carried out at temperatures in the range of about 175° to 250° F. in the presence of an azeotroping agent, such as benzene or toluene, to facilitate removal of water from the product. The method of preparation of the alkyl acrylates is not a part of this invention and the above procedure is merely illustrative.

The olefins useable in preparing products useful in the invention are the normal-alpha-monoolefins having about 12 to 40 carbon atoms. Typical useful alpha-monoolefins include dodecene-1, hexadecene-1, eicosene-1, tetracosene-1, octacosene-1, dotriacontene and tetracontene. Preferred olefins are those having about 16 to 30 carbon atoms such as octadecene, eicosene, tetracosene and octacosene.

The method of preparation of olefins used in the invention is not a part of the invention. If it is desired to prepare the olefins rather than to purchase them, they can be prepared by the Ziegler method. According to this method aluminum trialkyl is used to catalyze the polymerization of ethylene. This method produces a mixture of olefins which can be separated by distillation. Suitable mixed olefins are commercially available from Gulf Oil Company under the trademark "Gulftene".

The alkyl acrylate-olefin copolymer can be prepared by the following procedure: A suitable reaction vessel equipped with an agitator and cooling means is purged with nitrogen to remove oxygen, sealed and charged with the desired olefin monomer(s) and the reactor is heated to the desired reaction temperature. While maintaining the reaction temperature, the alkyl acrylate, a solvent, if one is used, and a suitable polymerization catalyst are charged to the reaction vessel continuously during the course of the reaction, which begins upon addition of catalyst to the reactor. After all of the catalyst has been introduced, the reaction temperature may be maintained for an additional period of time, for example, about an hour. The temperature of the reactor contents is then raised to effect desired curing of the product and to deplete the catalyst. At the conclusion of the curing step the reactor contents are cooled to about room temperature and the product is recovered from the reactor. The product may be used as is or it may be separated from the solvent by any suitable means, such as by distillation. The above method of polymerization is merely illustrative and is not a part of this invention.

The additives of this invention can be used to lower the pour points of hydrocarbon oils, which includes crude oils, gas oils, hydrocarbon fuel oils such as distillate fuel oils, including kerosene, diesel oil, heating oils, etc. and residual fuel oils, such as bunker C oil and navy grade special fuel oils, and other oils which contain substantial quantities of waxy materials and which present low temperature pumping and handling problems but excludes lubricating oils. In treating such oils the alkyl acrylate-olefin copolymer is introduced into the oil at a temperature above the solution temperature of the waxy component of the oil. This is usually above about 150° F. It has been found that the polymer is not as effective for producing the desired pour point depression if the mixing is carried out at a temperature substantially below the solution point of a substantial portion of the waxy component of the oil. As noted above the polymer can be in the form of a solution in the solvent in which the polymerization took place. If the polymerization solvent is an aromatic solvent and it is desired to not use a non-aromatic solvent the polymer can be separated from the aromatic solvent, as described above, and mixed with the desired solvent, such as an inert cutter stock, and the polymer-solvent mixture can be blended with the oil at an elevated temperature.

The following examples illustrate the preparation of the alkyl acrylate-olefin copolymer and the use of the copolymer as a pour point depressant. Unless otherwise specified, parts and percentages are on a weight basis. Pour Points are determined by the procedure of ASTM D-97. The weight average molecular weights of the copolymers is determined by gel permeation chromatography using polystyrene as the calibration standard.

EXAMPLE I

To a three-neck, one-liter glass reaction flask which is equipped with an agitator, a thermometer and a dropping addition funnel and which has been purged with nitrogen is charged 122 grams of a $C_{24}$-$C_{28}$ alpha olefin blend sold under the trademark Gulftene 24-28, 108 grams of n-octadecyl acrylate and 60 grams of cumene. The reaction mixture is heated under a nitrogen blanket to 80° C. and, with continuous stirring and the temperature maintained at 80° C., a solution of 1.44 grams of t-butyl peroctate in 20 grams of cumene is added to the reaction mixture over a four hour period. When the catalyst addition is completed the reaction temperature is raised to and maintained at 110° C. for one hour. At the end of this period the reaction mixture is cooled to 65°-70° C., and 225 grams of heavy aromatic solvent, sold under the trademark Exxon 654, is added. The polymeric product obtained has a weight average molecular weight of 13,715.

EXAMPLE II (Comparative)

The procedure of Example I is repeated except that the Gulftene 24-28 is omitted and 297 grams of octadeyl acrylate, 50 grams of cumene and 2.2 grams of t-butyl peroctoate in 20 grams of cumene are charged to the reactor. At the end of the reaction 225 grams of Exxon 654 solvent is added to the cooled reaction product.

EXAMPLE III

The procedure of Example I is repeated except that the monomer charge consists of 122 grams of Gulftene 24-28 and 108 grams of n-octadecyl acrylate, 68.7 grams of cumene is added as solvent and 3.42 grams of t-butyl peroctoate, dissolved in 20 grams of cumene, is added as catalyst. At the end of the reaction 241 grams of Exxon 654 solvent is added to the cooled reaction product.

EXAMPLE IV

The products of Examples I to III are evaluated as pour point depressants in Number 6 fuel oil. In runs 1-4 the fuel oil is diluted with 30% by volume diesel oil and in runs 5-7 the fuel oil is diluted with 15% by volume diesel oil. The results are tabulated in Table I. Runs 1 and 5 are control samples and contain no pour point depressant.

TABLE I

| Run | Pour Point Depressant | Depressant Dosage, ppm | Pour Point, °F. |
|---|---|---|---|
| 1 | None | — | 50 |
| 2 | Ex. I Product | 3000 | 5 |
| 3 | Ex. II Product | 3000 | 35 |
| 4 | Ex. III Product | 3000 | 25 |
| 5 | None | — | 65 |
| 6 | Ex. I Product | 2000 | 15 |
| 7 | Ex. I Product | 3000 | 10 |

EXAMPLE V

The products of Examples I and III are evaluated as pour point depressants in heavy fuel oil derived from Ekofisk Crude oil (Norway). The heavy fuel oil had a boiling range of >650° F. The results are tabulated in Table II.

TABLE II

| Run | Pour Point Depressant | Depressant Dosage, ppm | Pour Point, °F. |
|---|---|---|---|
| 1 | None | 0 | 45 |
| 2 | Ex. I Product | 2000 | 20 |
| 3 | Ex. I Product | 3000 | 0 |
| 4 | Ex. III Product | 2000 | 25 |
| 5 | Ex. III Product | 3000 | 0 |

The above examples show that copolymers of $C_{24}$-$C_{28}$ olefins mixture and octadecyl acrylate are excellent pour point depressants for residual fuel and heavy fuel oil. A comparison of results obtained using the Example I product and the Example II product as pour point depressants for residual fuel oil reveals that a copolymer of $C_{24}$-$C_{28}$ olefin and octadecyl acrylate is very much superior to octadecyl acrylate homopolymer as a pour point depressant.

Although the invention has been described by specific working examples, the scope of the invention is not limited thereto. Modifications of the invention which are not illustrated are contemplated. For example, mixtures of alkyl acrylates having 8 to 30 carbon atoms may be substituted for the octadecyl acrylate. The scope of the invention is limited only by the scope of the appended claims.

What is claimed is:

1. An oil composition comprising a hydrocarbon oil and a pour depressing amount of a copolymer of about 10 to 90 parts by weight of alkyl acrylate units containing about 8 to 30 alkyl carbon atoms and about 90 to 10 parts by weight of alpha-monoolefin units having about 12 to 40 carbon atoms per 100 parts by weight of copolymer, said copolymer having a weight average molecular weight of about 1,000 to 100,000.

2. The composition of claim 1 wherein said alkyl acrylate contains 16 to 28 alkyl carbon atoms and said alpha-monoolefin contains about 16 to 3 carbon atoms and said copolymer is present in said composition at a concentration of about 0.001 to 5.0 weight percent, based on the total weight of the composition.

3. The composition of claims 1 or 2 wherein said copolymer is about 30 to 60 parts by weight of alkyl acrylate units and about 70 to 40 parts by weight of alpha-monoolefin units per 100 parts by weight of copolymer.

4. The composition of claims 1 or 2 wherein the weight average molecular weight of the copolymer is 3,000 to 50,000.

5. The composition of claim 3 wherein the weight average molecular weight of the copolymer is 3,000 to 50,000.

6. The composition of claim 4 wherein the copolymer is present in said composition at a concentration of about 0.005 to 1%, based on the total weight of the oil composition.

7. The composition of claim 5 wherein the copolymer is present in said composition at a concentration of about 0.005 to 1%, based on the total weight of the composition.

8. An oil composition comprised of a hydrocarbon fuel oil and a copolymer of about 25 to 75 parts of units of at least one alkyl acrylate containing 16 to 28 alkyl carbon atoms and about 25 to 80 parts of units of at least one alpha-monoolefin containing about 16 to 30 carbon atoms, the copolymer having a weight average molecular weight of about 3,000 to 50,000 and being present in the composition at a concentration of about 0.005 to 1%, based on the total weight of the composition.

9. The composition of claim 8 wherein the alkyl acrylate is selected from the group consisting of n-octadecyl acrylate, n-eicosyl acrylate, n-docosyl acrylate, tetracosyl acrylate and mixtures of these and the alpha-monoolefin is selected from the group consisting of 1-octene, 1-eicosene, 1-docosene, 1-tetracosene and mixtures of these.

10. The composition of claim 9 where the alkyl acrylate is octadecyl acrylate and the alpha-monoolefin is 1-octene.

* * * * *